Aug. 4, 1959      J. M. OLSON      2,897,781
ANIMAL CARRIER FOR VEHICLES
Filed April 22, 1958      2 Sheets-Sheet 1
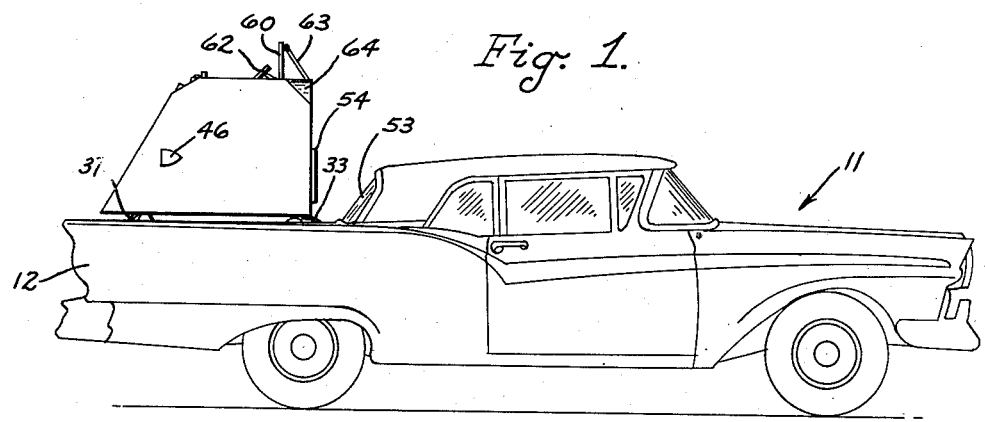
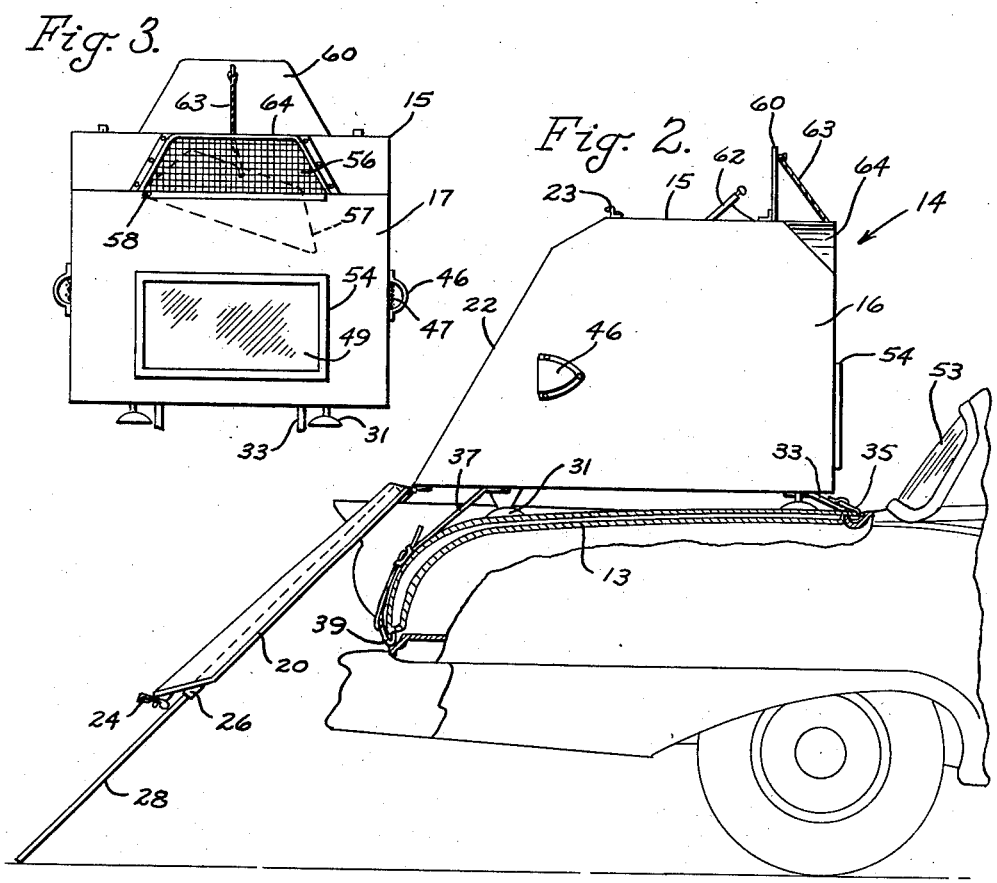
INVENTOR.
JAMES M. OLSON
BY
McMorrow, Berman & Davidson
ATTORNEYS

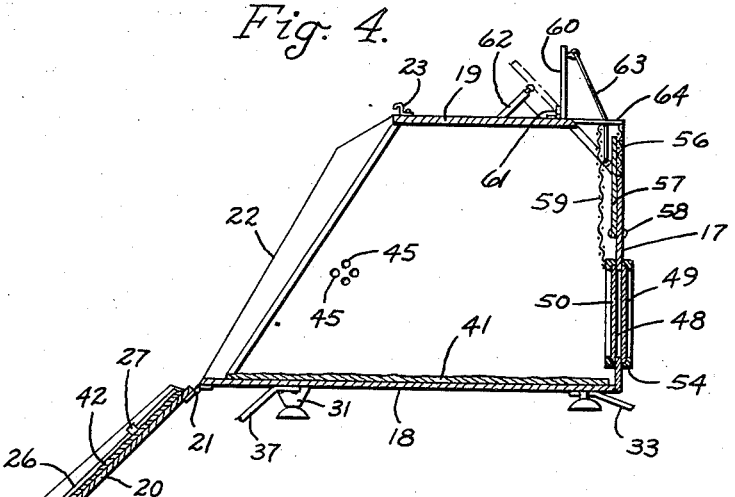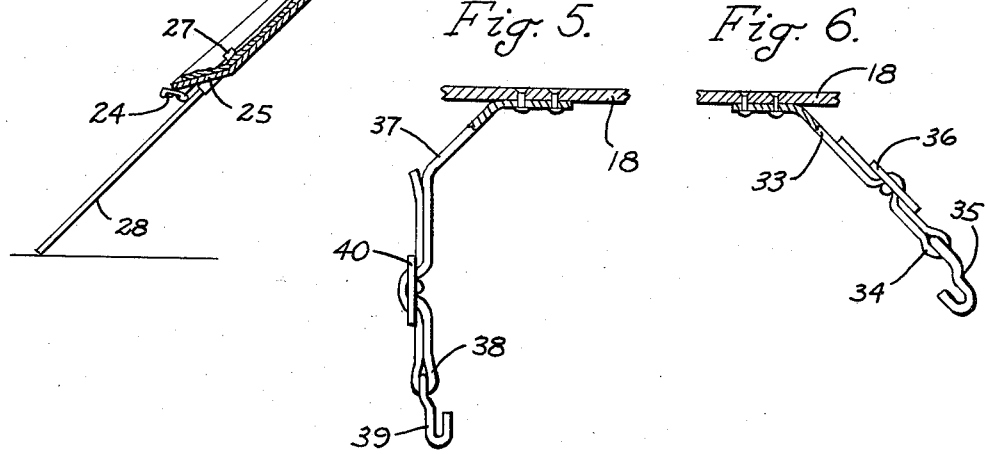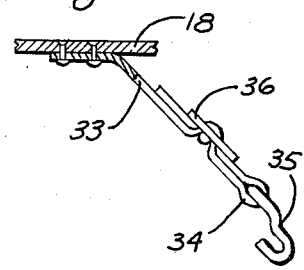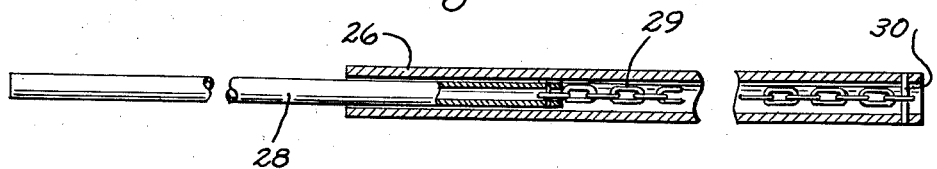
INVENTOR.
JAMES M. OLSON.

2,897,781
ANIMAL CARRIER FOR VEHICLES

James M. Olson, Belview, Minn.

Application April 22, 1958, Serial No. 730,100

2 Claims. (Cl. 119—19)

This invention relates to animal transporting devices, and more particularly to a device for transporting dogs or other animals comfortably on the rear portion of a conventional automobile.

A main object of the invention is to provide a novel and improved animal transporting device which is simple in construction, which is easy to mount on an automobile, and which is provided with novel and improved automatic ventilating means.

A further object of the invention is to provide an improved device for transporting a dog or similar animal on the cover of the trunk of a conventional automobile, said device being inexpensive to fabricate, being durable in construction, being neat in appearance, and being provided with improved ramp means whereby an animal may easily enter the carrier or leave same.

Further objects and advantages of the invention will become apparent from the following description and claims, and from the accompanying drawings, wherein:

Figure 1 is a side elevational view of an automobile provided with an improved animal carrier constructed in accordance with the present invention, shown mounted on the cover of the trunk of the automobile.

Figure 2 is an enlarged side elevational view, partly in vertical cross section, showing the manner in which the animal carrier is fastened to the front and rear edges of the trunk cover and illustrating the manner in which the hinged door of the carrier is swung downwardly and rearwardly to a position serving as a ramp to allow an animal to enter or leave the carrier.

Figure 3 is a front elevational view, to a reduced scale, of the carrier of Figure 2.

Figure 4 is a longitudinal vertical cross sectional view of the carrier in the position shown in Figure 2.

Figure 5 is an enlarged fragmentary vertical cross sectional view taken through a rear portion of the floor of the carrier of Figures 1 to 4, and showing one of the rear anchoring strap members.

Figure 6 is a fragmentary enlarged vertical cross sectional view taken through a forward portion of the floor of the carrier of Figures 1 to 4, showing one of the front anchoring straps.

Figure 7 is an enlarged longitudinal cross sectional view taken through one of the support rod housings employed with the door of the carrier of Figures 1 to 4, and showing the manner in which the support rod contained therein may be extended therefrom.

Referring to the drawings, 11 designates a conventional automobile provided with a trunk 12, said trunk having the hinged trunk cover 13. The cover 13 is hinged to the vehicle on a transverse horizontal axis in a manner whereby the cover may be swung in a clockwise direction from the closed position thereof shown in Figure 2.

Designated generally at 14 is an animal carrying attachment adapted to be secured on the trunk cover 13, said attachment comprising a rigid box-like receptacle which is provided with the vertical side walls 16, the front wall 17, the bottom wall 18, the top wall 19, and the hinged door 20, said door being hinged to the transverse rear edge of bottom wall 18, as shown at 21.

The rear edges of the vertical side walls 16 slope upwardly and forwardly, as shown at 22, whereby the door 20 engages against the sloping edges 22 of the side walls 16 when the door 20 is in its closed position, the rear marginal portion of the top wall 19 being provided with rearwardly extending fastening brackets 23 lockingly engageable by pivoted latch members 24 provided on the outer transverse marginal portion of the door 20. The cooperating fastener elements 24 and 23 are of any suitable type, and may be similar to the type employed for fastening windows.

As shown in Figures 2 and 4, the door 20 is preferably formed with the inclined transverse outer marginal portion 25, serving as a step to assist an animal in ascending the door when it is in its inclined opened position shown in Figures 2 and 4 wherein it serves as a ramp.

Secured in the side marginal portions of the door 20 and extending through the inclined step element 25 are the respective tubular guide members 26 which are fastened in any suitable manner, as by conventional pipe clamps 27, 27. Telescopically recevied in each of the tubular guide members 26 is a supporting rod 28 whose inner end is connected by a flexible chain 29 to a transverse anchoring pin 30 secured in the inner end portion of the associated tubular guide member 26, as shown in Figure 7, to limit extension of the supporting rods 28 from the guide members. Thus, when the door 20 is swung from its closed position to the downwardly and rearwardly inclined open position of Figures 2 and 4, the rod members 28 slide outwardly by gravity to ground-engaging positions and act to support the door 20. Thus the rods 28 support the door 20 in the inclined position shown in Figures 2 and 4, whereby the door serves as a ramp to assist an animal in entering the box-like receptacle 15 or in leaving same.

Secured to the bottom surface of bottom wall 18 adjacent the respective corners thereof are respective suction cup supporting units 31 engageable with the top surface of the trunk door 13, the rear suction cup units 31 being somewhat longer than the forward suction cup supporting units so as to maintain the bottom wall 18 of the receptacle 15 in a substantially horizontal position. Secured to the opposite end portions of the forward margin of bottom wall 18 are respective anchoring straps 33, said anchoring straps being formed with loops 34 engaging hook-like anchoring members 35, said members being adjustably secured to the straps 33 by means of buckle members 36, as shown in Figure 6. The hook-like anchoring members 35 are engageable around the forward edges of the trunk door 13 in the manner shown in Figure 2. Secured to the opposite sides of the rear marginal portion of bottom wall 18 are additional anchoring straps 37, said straps being formed with the loops 38 engaging hook-like anchoring members 39, said members 39 being adjustably secured to the anchoring straps by means of buckles 40, as shown in Figure 5. The anchoring members 39 are engageable around the rear edge of the trunk door 13 in the manner shown in Figure 2. Thus, by tightening the straps 33 and 37 after the anchoring members 35 and 39 have been engaged respectively with the front and rear edges of the trunk door 13, the receptacle 15 may be tightly secured to the trunk door 13.

Suitable removable mats 41 and 42 of deformable material with non-skid characteristics are provided on the bottom wall 18 of receptacle 15 and on the inner surface of the door 20. Thus, the mats 41 and 42 may be formed of any suitable resilient deformable material, such as rubber or the like with a suitably corrugated surface to provide non-skid characteristics. The mats 41 and 42 may be removably secured to floor 18 and door 20 by snap fasteners or other suitable means, allowing the mats to be readily removed for cleaning whenever required.

The side walls 16 are provided with respective groups of apertures 45 covered externally by cowling members 46 opening rearwardly and provided at their rearwardly open portions with screens 47 to prevent the entry of insects. The front wall 17 is provided at its lower portion with a window opening 48 in which are secured a pair of spaced parallel transparent window panes 49 and 50 which allow the interior of the receptacle to be viewed from the rear window of the automobile 11. The spaced transparent window panes 50 and 49 define an air space therebetween serving to prevent fogging of the window pane elements, and allowing a clear view of the interior of the receptacle through the rear window of the automobile. As shown in Figure 1, the rear window of the automobile, shown at 53 is located forwardly adjacent the window frame 54 around the outer transparent pane 49, so that the window 53 is substantially horizontally aligned with the window assembly of the receptacle 15, allowing the interior of the receptacle to be observed through rear window 53.

The upper portion of front wall 17 is formed with a ventilating opening covered by a screen 56. Designated at 57 is a closure plate which is pivoted to front wall 17 at a lower corner thereof subjacent the ventilating opening in the top portion of front wall 17, the pivotal connection of the closure plate 57 being shown at 58. A guard screen 59 is secured to the interior portion of front wall 17 over the closure plate 57 to prevent an animal in the carrier from interfering with the movement of the closure plate. As shown in Figure 4, the guard screen 59 is spaced sufficiently from closure plate 57 to allow free movement of said closure plate.

Designated at 60 is an upstanding vane member which is hinged to the top wall 19 on a transverse axis and which is normally limited in its clockwise movement, as viewed in Figure 4, to a position wherein it extends perpendicular to the top wall 19. Thus, as shown in Figure 4, in its vertical position the bottom edge of the vane 60 abuts against the top wall 19. However, the hinged connection, shown at 61, allows the vane member 60 to be rotated in a counterclockwise direction, such rotation being limited by its engagement with an inclined stop member 62 secured on top wall 19.

Designated at 63 is a flexible cable which connects the upper marginal portion of the flap member 60 to the intermediate portion of the upper margin of the closure plate 57, the cable 63 extending slidably through a suitable aperture provided therefor in the intermediate portion of the top wall of the hood-like frame 64 provided around the screened ventilating opening in the top portion of front wall 17.

Normally, namely, when the vehicle is at rest or is moving at a relatively slow speed, the weight of the closure plate 57 causes it to assume the position thereof shown in dotted view in Figure 3, wherein the ventilating opening at the top portion of front wall 17 is relatively open and allows air to move freely into the carrier. However, when the vehicle travels at a substantial speed, for example, a speed of approximately thirty miles per hour or more, the air pressure acting against the flap member 60 causes said flap member to be rotated rearwardly, namely, in a counterclockwise direction, as viewed in Figure 4, whereby the cable 63 elevates the closure plate 57 and moves said closure plate into obstructing relationship to the ventilating opening in the top portion of front wall 17, cutting off the admission of air into the carrier. The rearward movement of the flap member 60 is limited by its engagement with the top end of the stop member 62, as shown in dotted view in Figure 4. However, in this position, the closure plate 57 substantially covers the ventilating opening and prevents any appreciable amount of air from entering the receptacle 15.

As will be readily apparent, the animal in the receptacle is thus protected against an excessive influx of cold air when the vehicle is traveling at a substantial speed. However, when the vehicle is moving relatively slowly or is at rest, the ventilating opening in the front wall 17 is opened, allowing adequate ventilation of receptacle 15.

As will be readily apparent from Figure 2, the carrier 14 is mounted on the trunk door 13 in a manner allowing the trunk door to be opened whenever required, and allowing the trunk compartment of the automobile to be used in its normal manner without requiring the removal of the carrier.

While a specific embodiment of an improved carrier for dogs or other animals for use on the trunk cover of an automobile has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An animal carrier comprising a rigid box-like receptacle, means to detachably secure said receptacle to the trunk door of a motor vehicle, the front portion of said receptacle being formed with a ventilating opening, a closure plate pivoted to the front portion of said receptacle adjacent said opening and being swingable upwardly into obstructing relation thereto, a transverse flap member hinged to the top of said receptacle and projecting upwardly therefrom, and flexible cable means connecting said flap member to said closure plate, whereby said closure plate will be swung upwardly into obstructing relation to said opening responsive to a predetermined amount of air pressure caused by forward motion of the receptacle acting on said flap member and rotating same rearwardly.

2. An animal carrier comprising a rigid box-like receptacle having a vertical transverse front wall, means to detachably secure said receptacle to the trunk door of a motor vehicle, the upper portion of the front wall of said receptacle being formed with a ventilating opening a transverse vertical closure plate pivoted to the front wall of said receptacle adjacent said opening and being swingable upwardly into obstructing relation thereto, a transverse flap member hinged to the top of said receptacle and projecting upwardly therefrom, and flexible cable means connecting said flap member to said closure plate, whereby said closure plate will be swung upwardly into obstructing relation to said opening responsive to a predetermined amount of air pressure caused by forward motion of the receptacle acting on said flap member and rotating same rearwardly.

References Cited in the file of this patent

UNITED STATES PATENTS

| | | |
|---|---|---|
| 843,959 | McBride | Feb. 12, 1907 |
| 1,946,000 | Samuels | Feb. 6, 1934 |
| 1,958,229 | Beech | May 8, 1934 |
| 2,274,029 | Archer | Feb. 24, 1942 |
| 2,821,165 | Wright | Jan. 28, 1958 |